(12) United States Patent
Ovadia

(10) Patent No.: US 11,509,543 B2
(45) Date of Patent: Nov. 22, 2022

(54) OPEN-SOURCE ARCHITECTURE FOR REMOTE PHYSICAL OR REMOTE PHYSICAL-MEDIA ACCESS CONTROL DEVICE

(71) Applicant: Charter Communications Operating, LLC, St. Louis, MO (US)

(72) Inventor: Shlomo Ovadia, Denver, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/245,055

(22) Filed: Apr. 30, 2021

(65) Prior Publication Data
US 2021/0367857 A1 Nov. 25, 2021

Related U.S. Application Data
(60) Provisional application No. 63/028,278, filed on May 21, 2020.

(51) Int. Cl.
| | | |
|---|---|---|
| H04L 41/16 | (2022.01) | |
| G06N 20/00 | (2019.01) | |
| H04L 41/147 | (2022.01) | |
| H04L 43/045 | (2022.01) | |
| H04Q 9/00 | (2006.01) | |
| H04L 67/562 | (2022.01) | |

(52) U.S. Cl.
CPC ............ *H04L 41/16* (2013.01); *G06N 20/00* (2019.01); *H04L 41/147* (2013.01); *H04L 43/045* (2013.01); *H04L 67/562* (2022.05); *H04Q 9/00* (2013.01)

(58) Field of Classification Search
CPC ..... H04L 41/16; H04L 41/147; H04L 43/045; H04L 67/2809; H04L 67/562; H04Q 9/00
See application file for complete search history.

(56) References Cited

U.S. PATENT DOCUMENTS
2016/0062746 A1\* 3/2016 Chiosi ................. G06F 8/35
  717/104
2017/0078216 A1\* 3/2017 Adolph ................. H04L 67/16
(Continued)

OTHER PUBLICATIONS
M. Bjorklund, Ed., Internet Engineering Task Force, Request for Comments 7950, Aug. 2016. (Year: 2016).\*

*Primary Examiner* — Philip C Lee
(74) *Attorney, Agent, or Firm* — Young Basile Hanlon & MacFarlane, P.C.

(57) ABSTRACT

A remote node device including a hardware layer, a hardware abstraction layer, and a software stack operating on the hardware abstraction layer. The software stack including an open-source cloud-based operating system integrated with a service provider defined abstraction layer configured to coordinate functionality of the software stack, virtualized software components such as a virtualized Converged Cable Access Platform (vCCAP) implemented in docker containers where the vCCAP is configured to command and control the remote node device with respect to a customer premise equipment. The software layer of the remote node device includes different types of YANG data models for model-driven management and model-driven telemetry from the remote node device and a customer premise equipment to a service provider back-office system.

18 Claims, 6 Drawing Sheets

(56) References Cited

U.S. PATENT DOCUMENTS

| | | | |
|---|---|---|---|
| 2018/0131745 A1* | 5/2018 | Shakir | H04L 41/0853 |
| 2019/0052549 A1* | 2/2019 | Duggal | H04L 41/5019 |
| 2019/0163546 A1* | 5/2019 | Ungar | G06F 11/3476 |
| 2019/0281373 A1* | 9/2019 | Sadasivarao | H04L 41/0226 |
| 2020/0065085 A1* | 2/2020 | Talbert | G06F 8/65 |
| 2021/0152490 A1* | 5/2021 | Rampley | H04L 47/805 |
| 2021/0176142 A1* | 6/2021 | Clarke | H04L 41/5025 |

* cited by examiner

OPEN-SOURCE ARCHITECTURE FOR REMOTE PHYSICAL OR REMOTE PHYSICAL-MEDIA ACCESS CONTROL DEVICE

This application claims priority to and the benefit of U.S. Provisional Application Ser. No. 63/028,278, filed on May 21, 2020, the entire disclosure of which is hereby incorporated by reference.

TECHNICAL FIELD

This disclosure relates to remote node devices used for remote management and telemetry of customer premise equipment. More specifically, this disclosure relates to open-source and/or modular based architectures for the remote node devices to enable configuration agility and telemetry data distribution efficiency.

BACKGROUND

Service providers or operators provide data, voice, video, Internet, and other services to customers. The primary access platform is Data Over Cable Service Interface Specification (DOCSIS) over a hybrid-fiber/coax (HFC) cable network. The DOCSIS platform enables bidirectional traffic between a service provider system head-end and customer locations over the HFC network.

A Cable Modem Termination System (CMTS) is the central platform which enables provision of high-speed data services, such as cable Internet or Voice over Internet Protocol services. Traditionally, the CMTS is located in the service provider system head-end. The CMTS has various logical functions, including but not limited to, DOCSIS physical (PHY) Layer functionality (including upstream receiver and downstream transmitter), DOCSIS MAC Layer (including upstream MAC and scheduler, downstream MAC processing, DOCSIS quality of service (QoS), and security), radio frequency (RF) output block, L2 forwarding block, L3 forwarding block, IP processing for Dynamic Host Configuration Protocol (DHCP), Simple Network Management Protocol (SNMP) agent, command line interface (CLI), and the like.

The CMTS platform architecture is evolved to become a Distributed Access Architecture (DAA), where some of the network functions that typically reside in the headend or the hub are moved closer to the end-user, reducing the amount of hardware that needs to be housed at the head-end, thus creating efficiencies in speed, reliability, and latency for supporting high-speed data and video services. One of the attractive options of DAA to support the DOCSIS 4.0 CableLabs standards is the Flexible MAC Architecture (FMA), where an integrated Converged Cable Access Platform (CCAP) architecture is separated into different cores and digital access network components. The basic idea is to distribute some or all of the CMTS/CCAP functionality down to a remote location such as the fiber node (referred to herein as the "remote node"). There are two main DAA architectures: Remote PHY (R-PHY) architecture and FMA. The FMA architecture moves the MAC and PHY layer functionality into the remote node or hub location. This enables disaggregating many of the higher-level functions integrated in the CCAP platform into multiple core network components within the distributed access network. The core components of the FMA are MAC Manager, PacketCable Aggregator, Video Cores, out-of-band (OOB) Cores, Core Timing Devices, and Core Access Devices. Such an appliance at the remote node location is called a Remote MAC-PHY Node (RMN) or Remote MACPHY Device (RMD).

The remote PHY architecture splits the CMTS functionality between the MAC and the PHY Layers and moves the PHY layer to the remote node. In this architecture, the integrated CCAP is separated into two distinct components. The first component is the CCAP core and the second component is the R-PHY Device (RPD). The CCAP core typically contains both a CMTS core for DOCSIS and an Edge Quadrature Amplitude Modulation (QAM) (EQAM) core for Video. The EQAM functions could also be in an auxiliary (video) core. The RPD contains mainly PHY related circuitry, such as downstream QAM modulators, upstream QAM demodulators, together with pseudo-wire logic to connect to the CCAP core. The RPD platform is a physical layer converter whose functions are to convert downstream DOCSIS, MPEG video and out-of-band (OOB) signals received from a CCAP core over a digital medium such as Ethernet or passive optical network (PON) to analog for transmission over RF or linear optics, and to convert upstream DOCSIS and OOB signals received from an analog medium such as RF or linear optics to digital for transmission over Ethernet or PON to a CCAP core.

The RMD is an intelligent access device that provides DOCSIS MAC and the upper layer protocols, including all DOCSIS signaling functions, downstream and upstream bandwidth scheduling, and DOCSIS framing. In addition, the RMD provides all PHY-related circuitry needed for HFC high-speed data, voice, and video services, such as downstream QAM modulators and digital-to-analog converters (DACs) and upstream analog-to-digital converters (ADCs) and QAM demodulators to convert downstream MPEG video and OOB signals received from an Auxiliary Core over a digital medium such as Ethernet or a passive optical network (PON) into analog for transmission over RF or linear optics, and to convert the OOB signals received over the RF or linear optics into digital for transmission over Ethernet or PON to an Auxiliary core.

The hardware/middleware/software stack in the RPD or RMD have multiple issues. Service providers or multiple systems operators (MSOs) are moving toward cloud-based infrastructures for command/control and telemetry, where cloud-based refers at least to applications, services or resources made available to users on demand via the Internet or a network. In addition, some vendors propose to use the Yet Another Next Generation (YANG) model to drive telemetry for the RMD/RPD protocol stack. Even though the YANG model definitions will be specified by CableLabs and the status variables will be in the public domain, this is a huge software development effort, involving often a monolithic proprietary software protected by vendor intellectual property. Despite protocol design-based on open CableLabs specifications, the developer community has currently no modular and/or open-source code project at its disposal. This means proprietary software code from each vendor. Moreover, the YANG model-based telemetry could burden the access customer premise equipment (CPE) device with additional proprietary software components, resulting in increased CPE cost, which is undesirable.

SUMMARY

Disclosed herein are methods, apparatus, and systems for open-source architecture for remote physical or remote physical-media access control devices.

In implementations, a remote node device includes a hardware layer, a hardware abstraction layer, and a software stack operating on the hardware abstraction layer. The software stack including an open-source or modular cloud-based operating system integrated with a service provider defined abstraction layer configured to coordinate functionality of the software stack, virtualized software components, such as a Converged Cable Access Platform (vCCAP), implemented in a docker container, configured to command and control the remote node device with respect to a customer premise equipment. The software layer of the remote node device includes different types of YANG data models for model-driven management and model-driven telemetry from the remote node device and the customer premise equipment to a service provider back-office system.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
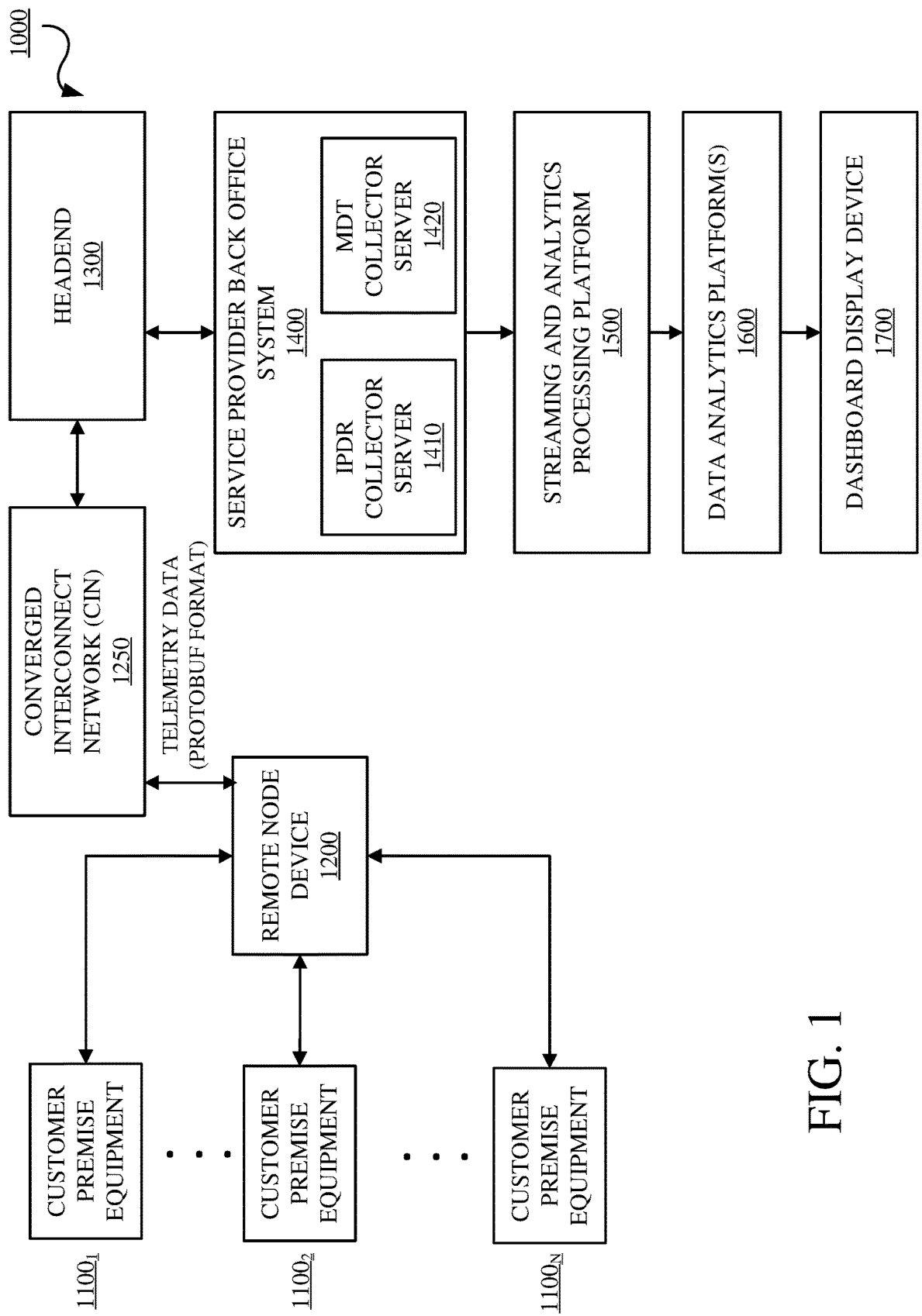
FIG. 1 is a diagram of an example a remote node device network architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. The computer can include, for example, a processor.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telemetry data communication, data management, data visualization, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Remote node devices, such as RPDs and RMDs, are to be deployed by a number of service providers and MSOs (collectively "service providers") as part of the DAA architecture. Some service providers are using cloud-based remote management and telemetry such as an OpenSync layer for field-deployed routers. Some service providers are using cloud-based remote management and telemetry (i.e., OpenSync) for access CPE devices such as, for example, cable modems, Embedded Multimedia Terminal Adapters (eMTAs) and optical network unit (ONU) devices. The software architecture of new and in development RPDs and RMDs is monolithic and highly proprietary, and does not leverage and optimize the use of different options for streaming telemetry data to a service provider's streaming and analytics platform as supplemented by machine learning models. In addition, model-driven telemetry (MDT) YANG data model telemetry from all the connected access CPE devices could burden the remote node devices with additional proprietary software components, resulting in large overhead, including increased remote node cost, which is undesirable.

Described herein are methods, apparatus, and systems for open-source and/or modular architecture for remote physical or remote physical-media access control devices (collectively "remote node devices"). In implementations, a remote node device can employ an open-source and/or modular hardware, middleware, and software stack (collectively "stack") using an open-source operating system (OS) which is integrated with a silicon vendor's middleware software development kit (SDK), virtualized software components such as a virtualized Converged Cable Access Platform (vCCAP) user plane software component, and vCCAP control plane software component. The resulting stack configuration can boost remote node device scalability and resource utilization using off-the-shelf cloud-connected servers, rapid feature innovation, interoperability among multiple remote node device's vendors, and rapid time-to-market availability. Furthermore, the RMD is designed to enable Software-Defined Networking (SDN) such that the management and control plane and user data plane are self-contained entities that are disaggregated and communicate over open interfaces.

FIG. 1 is a diagram of an example architecture or system 1000 in accordance with some embodiments of this disclosure. In an implementation, the architecture 1000 can include one or more customer premise equipment (CPE) $1100_1$, $1100_2$, ..., $1100_N$ connected to or in communication with (collectively "connected to") a remote node device 1200, which in turn is connected to a Converged Interconnect Network (CIN) 1250, a service provider and/or cable headend 1300, and a service provider back-office system 1400. The service provider back-office system 1400 is further connected to a streaming and analytics processing platform 1500, which in turn in is connected to one or more data analytics platforms 1600. The one or more data analytics platforms 1600 are connected to a dashboard display device 1700. The CPE $1100_1$, $1100_2$, ..., $1100_N$, the remote node device 1200, the CIN 1250, the headend 1300, the service provider back-office system 1400, the streaming and analytics processing platform 1500, the one or more data analytics platforms 1600, and the dashboard display device 1700 can be connected using one or more of pseudo-wire, wired, wireless, the Internet, an intranet, a low power wide area network (LPWAN), a local area network (LAN), a wide area network (WAN), a public network, a private network, a cellular network, a Wi-Fi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The architecture 1000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein. Each of the components described in the architecture 1000 can include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The CPE $1100_1$, $1100_2$, ..., $1100_N$ can be cable modems, Embedded Multimedia Terminal Adapters (eMTAs), optical network unit (ONU) devices, gateways, routers, set-top boxes, and the like which provides connectivity including Internet connectivity, wired connectivity, wireless connectivity, data, voice over IP, and combinations thereof. In implementations, the CPE $1100_1$, $1100_2$, ..., $1100_N$ can include a voice gateway and external battery backup (EBBU) in case of external power failure.

The remote node device 1200 can be a RPD, RMD, and the like which splits the CMTS and associated functionality as described herein. The remote node device 1200 is further described with respect to FIG. 2.

The CPE $1100_1$, $1100_2$, ..., $1100_N$ and the remote node device 1200 can be referred to collectively as network devices.

The CIN 1250 can include a Leaf or Secure-Leaf (S-Leaf) and Spine high-speed switches and routers that provide Layer 2 (L2) or Layer 3 (L3) traffic aggregation and routing of the DAA network elements such as the RPD and RMD.

The headend 1300 in the FMA consists of different core components such as the MAC Manager, Video core, and other auxiliary core components such as OOB core, PacketCable Aggregator, and core timing devices. In the R-PHY architecture, the CCAP core can be located at a service provider's HFC hub or headend 1300, and collaborates with the remote node device 1200 to provide services to the CPE $1100_1$, $1100_2$, ..., $1100_N$.

High-speed network switches are used in the CIN 1250 to connect the headend 1300 at different locations to the service provider back-office system 1400. The service provider back-office system 1400 can provide remote management services and collect telemetry data from one or more remote node devices such as remote node device 1200. The service provider back-office system 1400 can provide and/or include an Internet Protocol Detail Record (IPDR) collector 1410, a YANG data model telemetry server and/or model-driven telemetry (MDT) server 1420, a proactive network maintenance (PNM) server, a Dynamic Host Configuration Protocol (DHCP) server, an authentication, authorization, and accounting (AAA) server, a syslog server, a time-of-day server, and other back-office services and/or servers.

The IPDR collector 1410 can collect IPDR data streams from one or more remote node devices (an IPDR exporter) such as remote node device 1200. In implementations, the IPDR streams from the one or more remote node devices can be collected simultaneously.

The YANG data model telemetry server and/or model-driven telemetry (MDT) server 1420 can collect MDT telemetry data from the remote node device 1200.

Figure 3:
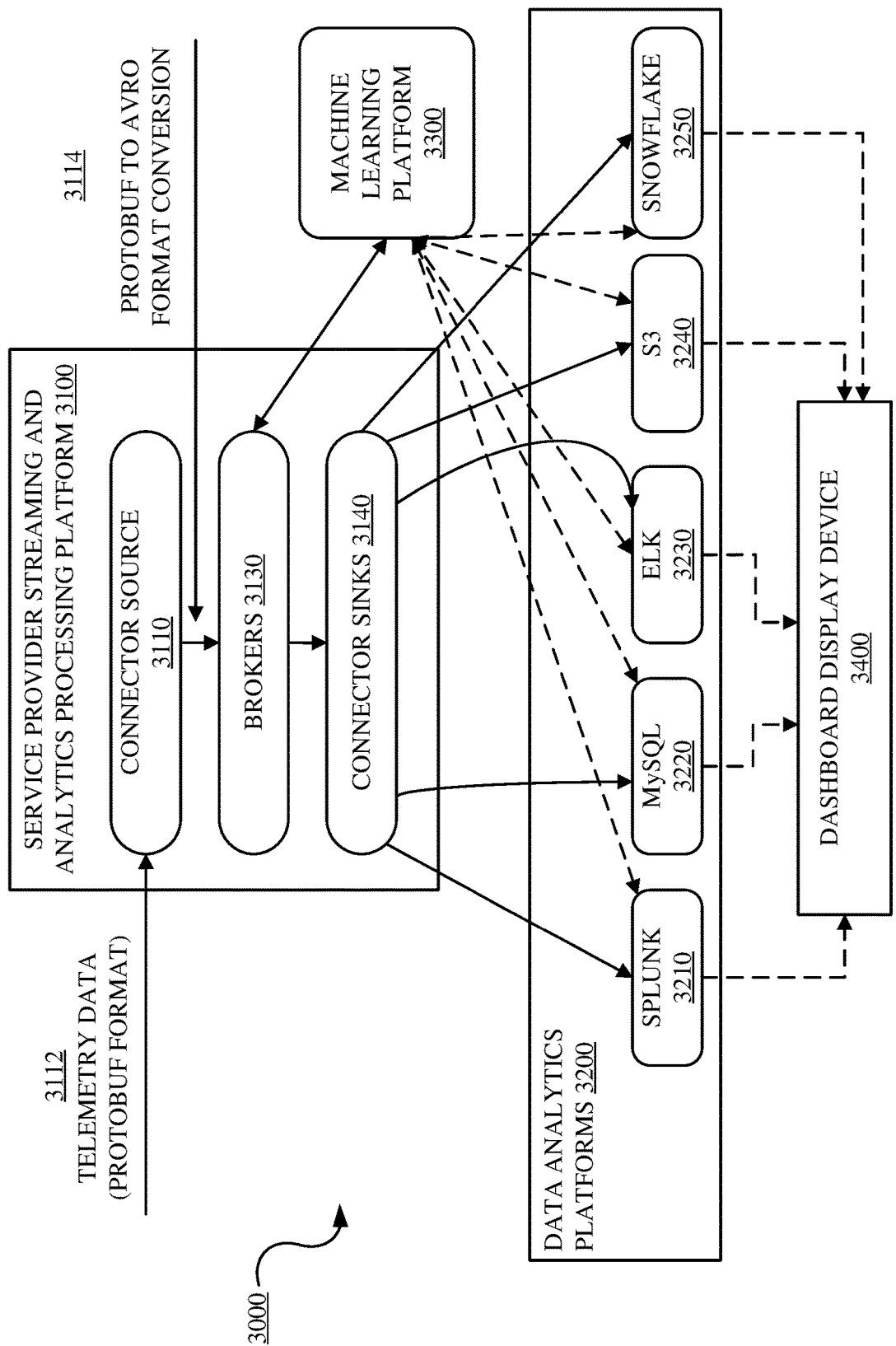
FIG. 3 is a diagram of an example of a telemetry data reporting architecture in accordance with embodiments of this disclosure.

The streaming and analytics processing platform 1500 and the one or more data analytics platforms 1600 are further described with respect to FIG. 3.

The dashboard display device 1700 can include smart monitors, smartphones, computers, desktop computers, handheld computers, PDAs, personal media devices, notebooks, notepads, phablets, and the like which provide alerts, communication interfaces to the service provider. In implementations, the dashboard display device 1800 includes dashboards for real-time monitoring of the CPE $1100_1$, $1100_2$, ..., $1100_N$, the remote node device 1200, and the like.

Figure 2:
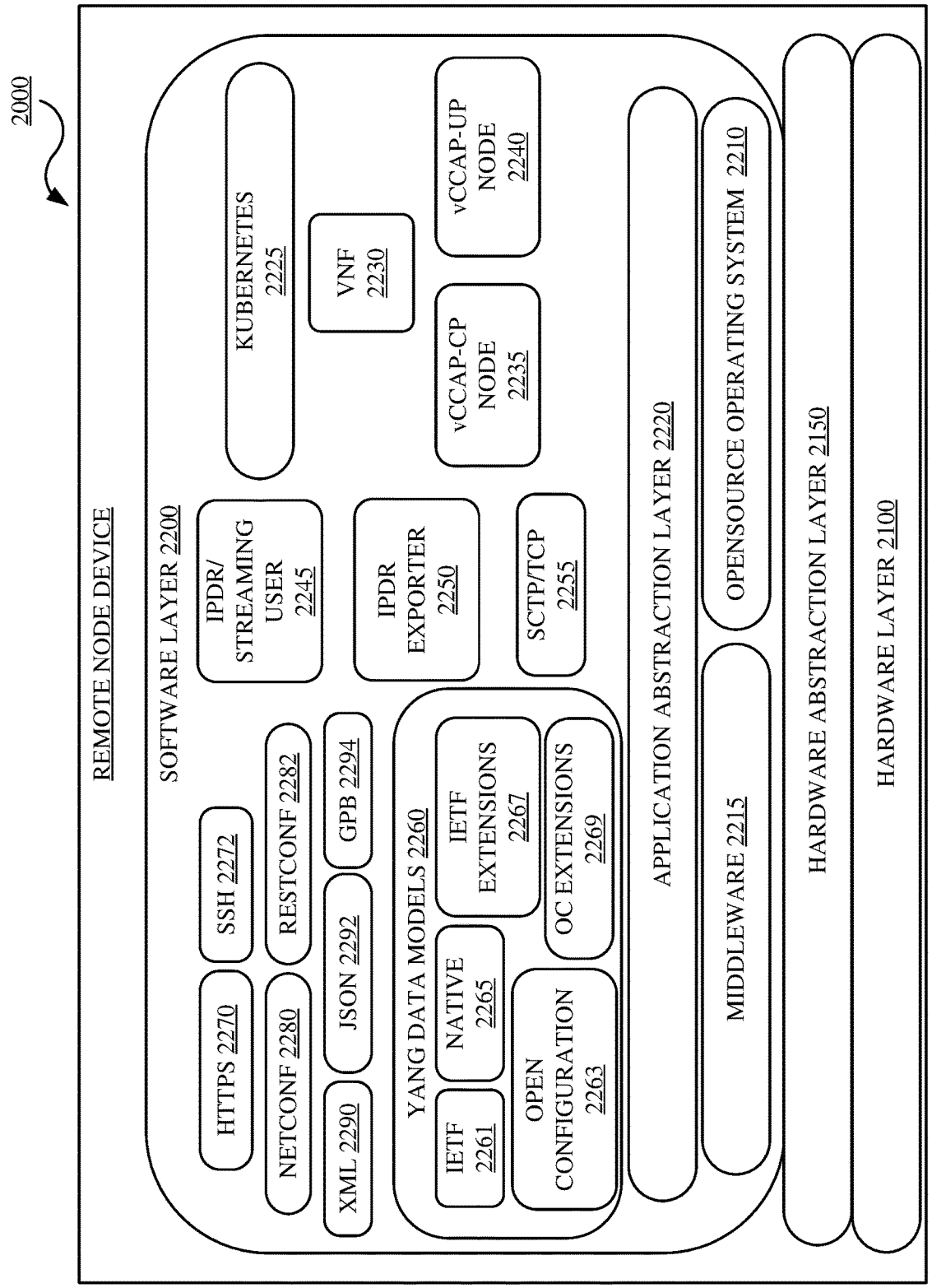
FIG. 2 is a block diagram of an example of a remote node device's software architecture in accordance with embodiments of this disclosure.

FIG. 2 is a block diagram of an example remote node device software architecture 2000 in accordance with embodiments of this disclosure. The remote node device software architecture 2000 implements a stack including a hardware layer 2100, Hardware Abstraction Layer (HAL) 2150, and a software layer 2200 which collectively streams telemetry data to the service provider's streaming and analytics processing platform 1500 via the service provider back-office system 1400. The HAL 2150 provides the Application Programming Interfaces (APIs) between the hardware drivers in the hardware layer 2100 and the various software components in the software layer 2200.

The software layer 2200 includes an open-source and/or modular cloud operating system (OS) 2210 integrated with a silicon vendor middleware layer 2215, an application abstraction layer 2220, a docker container management module such as Kubernetes 2225, an open-source and/or modular virtualized network function (VNF) 2230, a virtualized software component such as vCCAP-control plane (CP) function 2235, a virtualized software component such as vCCAP-user plane (UP) function 2240, an IPDR Streaming Protocol (IPDR/SP) 2245 for backward compatibility with legacy CMTS devices, an IPDR exporter 2250, a Stream Control Transport protocol (SCTP)/transmission control protocol (TCP) module 2255, YANG data models 2260 including standard models such as Internet Engineering Task Force (IETF) based data models 2261 and OpenConfig models 2263, a native data model 2265, and proprietary extensions of the standards' based data models such as IETF extensions 2267 and OpenConfig based data model extensions 2269, a Hypertext Transfer Protocol Secure (HTTPS) module 2270, a Secure Shell Protocol (SSH) module 2272, a Network Configuration Protocol (NETCONF) module 2280, a RESTCONF module 2282, a XML communication protocol module 2290, a JSON protocol module 2292, and a Google Protocol Buffers (GPB) module 2294. The remote node device 2000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The virtualized software components such as the vCCAP-CP node 2235 and the vCCAP-UP node 2240 (collectively "vCCAP") provide functionality such as, but not limited to, PacketCable 1.5/2.0 (for RPD as the remote node device), DOCSIS 4.0 and 3.1 PHY and MAC functionality (only for RMD in FMA), standard interface between the network components located at the headend 1300 and the vCCAP-CP node 2235 and the vCCAP-UP node 2240 using 10 GbE link as an example, policy-based routing (handled by the CIN 1250), multicast (PIM, IGMP) (handled by components in the headend 1300), external IEEE 1588v2 timing, CCAP Operations Support System Interface (OSSI), and the like. The virtualized software components provide operational or command and control functionality with respect to the remote node device and the customer premise equipment. The virtualized software components enable at least high-speed services, such as data, voice, and video services, to the customer premise equipment. The virtualized software component and model-driven YANG data models provide management of the remote node device and configure one or more customer premise equipment.

As described herein, some of the vCCAP features can be located at the headend 1300, while the PHY layer features would be located at the RPD. For the RMD, the majority of the vCCAP features are located at the RMD. Each of these vCCAP features can be implemented in a Docker container with Kubernetes 2225 containers' orchestration. For example, the R-PHY software component can be implemented as VNF 2230 in a Docker container to provide the PHY layer functionality of the remote node device. For example, one or more modular virtualized network functions (VNFs) can provide the physical and media access control layer functionality of the remote node device and can be implemented in a docker container.

As shown, the remote node device software architecture 2000 includes different types of YANG data models for streaming telemetry data. YANG is a data modeling language for configuration and monitoring. Model-driven Telemetry (MDT) is a technique for a network device to collect operational data based on the device's applications subscription, and continuously streams the collected data using a push model. There are two MDT operational modes, namely Dial-In and Dial-Out. The Dial-Out MDT operational mode can provide broader flexibility in transport options, has no requirement to open ports for inbound management traffic, and includes anycast and load-balancing features. The YANG data models can also be used over standard protocols such as NETCONF and RESTCONF to configure and manage the network device such as the remote node device.

Applications can subscribe to selected elements of YANG data models over a standards protocol such as NETCONF, RESTCONF and/or gNMI/gRPC. Model driven streaming telemetry allows monitored data to be pushed from the monitored device, i.e., the RPD or RMD, to an external collector at a higher frequency than polling, push data only when an event has occurred in the network (event driven telemetry), and combinations thereof. A periodic collection method, when a device pushes data at a defined interval, is better suited to monitoring of frequently changing metrics.

The IETF based data model 2261 is defined at RFC 6020 (published in October 2010), with an update at RFC 7950 (published in August 2016).

The OpenConfig based data model 2263 is defined by OpenConfig, a working group of network operators, using vendor-neutral YANG data models for streaming telemetry configurations and notifications. In implementations, the OpenConfig MDT Dial-Out via gRPC (high-performance Remote Procedure Call) protocol with Protobuf encoding can be used. The OpenConfig based data model 2263 offers telemetry configuration without a transaction, obtaining telemetry data to determine when a configuration without a transaction has occurred, and enabling telemetry configuration without a transaction from a CPE or from an MDT collector.

The native data models 2265 are service provider defined proprietary data models, which can be event-driven or periodically-driven. These can be customized by the service provider for specific vendor equipment such as the remote node device. For example, a proprietary model could be a security notification model which provides event driven data if the number of remote accesses exceed a threshold.

The IETF extensions 2267 and the OpenConfig based data model extensions 2269 are proprietary extensions to the standard YANG data models such as the IETF model 2261 and the OC model 2263. The proprietary extension is a conditional portion of a standard YANG model which can be a feature depending on hardware platform capabilities and it is not available by other service providers. For example, a match condition for packet classification can be used in YANG Access Control List (ACL) module as the conditional portion.

Segregating the type of required telemetry data can reduce the telemetry burden on the remote node device 2000 and increase the remote node device 2000 operational efficiency. Table 1 shows a summary of telemetry methods for different types of network devices.

TABLE 1

| Telemetry Method/Device | Access CPE (cable modem (CM)) | Remote Node Device |
|---|---|---|
| IPDR/SR | Limited - such as subscriber's billing records | No |
| Model-Driven Telemetry (MDT) | Yes (Not Preferred) | OpenConfig YANG Data Models |
| OpenWrt Smart Agent | Yes (Preferred) | No |

As show, the telemetry methods for the access CPE (CM) include using OpenWrt with Self-Monitoring, Analysis, and Reporting Technology (SMART) to stream the access CPE (CM) system and home network telemetry data directly to the service provider streaming and analytics processing platform via an OpenSync cloud, which bypasses the remote node device. Another method streams limited telemetry data, such as the subscriber's billing records, to the remote node device using IPDR/SR.

For the remote node device, Model-Driven Telemetry (MDT) can be used to directly stream the remote node device telemetry data to the service provider streaming and analytics processing platform using OpenConfig Dial-Out YANG data models via NETCONF and RESTCONF protocols via XML and JSON format schemas in the software stack. The MDT can also be used to transmit CPE telemetry data.

As shown, the remote node device software architecture 2000 includes the IPDR/SP 2245 and the IPDR exporter 2250. IPDR/SP 2245 is used to collect and record data traffic statistics produced on a network between an IPDR Exporter (such as a remote node device) and an IPRD Collector (such as IPRD collector 1420). IPDR/SP 2245 captures data on a per subscriber device basis. In the IPDR DOCSIS model, the IPDR Exporter (CMTS or remote node device) generates IPDR data, then the IPDR Collector collects bulk data statistics, such as usage metrics, via the IPDR/SP protocol. The IPDR Collector software can run on a separate virtual machine (VM) and collect the IPDR streams from multiple remote node devices simultaneously.

The IPDR/SP 2245 can be used between the CPE $1100_1$, $1100_2$, . . . , $1100_N$ and the remote node device 2000 located at the fiber nodes. XML-based configuration files (2290) can be used to collect all the required subscriber information such as billing records as well as health metrics parameters for the specific access CPE device. The CPE $1100_1$, $1100_2$, . . . , $1100_N$ via the DOCSIS protocol suite send the requested IPDR data such as the user's billing records to the remote node device, which uses the IPDR exporter 2250 to send all the collected IPDR data from all the cable modems to the IPDR collector. SCTP/TCP 2255 can provide a highly reliable and resilient transport protocol for the IPDR telemetry data. Furthermore, the service providers can define and standardize abstraction layer 2220 APIs to be implemented for all the access CPE vendors to facilitate the streaming data collection by the remote node device 2000.

As shown, the remote node device software architecture 2000 includes YANG data models 2260. The YANG data models 2260 can be integrated with the NETCONF 2280 and RESTCONF 2282 for remote node device 2000 remote configuration and management via CCAP APIs defined by CableLabs. NETCONF is a standard protocol for installing, manipulating, and deleting configuration of network devices. YANG is used to model both configuration and state data of network elements.

As noted, YANG is a data-modeling language (instead of TR-069 data models) which can be used to describe network device configuration and operational data, and take administrative actions manipulated by NETCONF and REST-CONF. YANG data models model the hierarchical organization of data as a tree in which each node has a name and either a value or a set of child nodes. To facilitate the integration of the YANG data models on the remote node device 2000 stack, service providers can define and standardize the abstraction layer 2220 APIs for any new software plugins and/or components, resulting in faster feature development and deployment as well as feature portability across different vendor remote node device platforms.

The remote node device network architecture 1000 and the remote node device software architecture 2000 can be implemented, for example, with an open-source carrier-grade operating system such as an OpenStack-based software architecture integrated with service provider defined abstraction layer and with virtualized software components for vCCAP functionality to enable command/control of the remote node device. The remote node device network architecture 1000 and the remote node device software architecture 2000 also provide XML-based configuration files with IPDR/SP, XML/JSON-based notifications with OpenConfig/IETF YANG data models using NETCONF and RESTCONF protocols as alternatives for streaming telemetry data. The remote node device network architecture 1000 and the remote node device software stack 2000 further provide an ability to standardize service provider hypertext application language APIs for new software apps and/or components, resulting in faster development and deployment of new software features, and feature portability across different vendor remote node device platforms.

FIG. 3 is a diagram of an example the data telemetry reporting architecture 3000 from architecture 1000 in accordance with embodiments of this disclosure. The data telemetry reporting architecture 3000 includes a service provider streaming and analytics processing platform 3100 connected to one or more data analytics platforms 3200 and a machine learning platform 3300, both of which in turn are connected to a dashboard display device 3400. The service provider streaming and analytics processing platform 3100, the one or more data analytics platforms 3200, the machine learning (ML) platform 3300, and the dashboard display device 3200 are connected using one or more of pseudo-wire, wired, wireless, the Internet, an intranet, a low power wide area network (LPWAN), a local area network (LAN), a wide area network (WAN), a public network, a private network, a cellular network, a Wi-Fi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The architecture 1000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein. Each of the components described in the architecture 1000 can include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The service provider streaming and analytics processing platform 3100 includes a connector source 3110 for receiving telemetry data in a Protobuf format (3112), one or more brokers 3130, and one or more connector sinks 3140. In implementations, the connector source 3110 can be a Kafka connector source. In implementations, the one or more brokers 3130 can be Kafka brokers. In implementations, the one or more connector sinks 3140 can be Kafka sinks. The one or more brokers 3130 are connected to the machine learning platform 3300. The one or more connector sinks 3140 are connected to data analytic platforms in the one or more data analytics platforms 3200 such as, for example, Splunk 3210, an open-source relational database tool such as MySQL 3220, an open-source search and analytics tool such as Elasticsearch (ELK) 3230, a cloud-based storage management tool such as Amazon S3 tool 3240, and/or a cloud-based data warehouse tool such Snowflake 3250. The machine learning platform 3300 is connected to each of the data analytic tools in the one or more data analytics platforms 3200. The data analytic platforms feed the dashboard display device 3200, which can be, for example, a Grafana dashboard.

The data telemetry reporting architecture 3000 can use the service provider streaming and analytics processing platform 3100 for all the streaming telemetry data from all the different remote node devices in the fiber nodes and/or at a hub-site between the cable headend and the fiber node, and to access CPE devices at customer locations. The telemetry data is transmitted via the CIN 1250 and the cable headend 1300 to the service provider back-office system 1400, and to the service provider streaming and analytics processing platform 3100. The different types of telemetry data (i.e., MDT YANG data models for collecting telemetry data from remote node devices and CPEs and IPDR for collecting telemetry data for CPEs) are transmitted from the remote node device 1200 in Protobuf format (i.e., serialized data format) to the MDT collector 1420 and the IPDR collector 1410 located at the service provider back-office system 1400.

The connector source 3110 for the MDT collector 1420 and the IPDR collector 1410 receive the telemetry data from the MDT collector 1420 and the IPDR collector 1410 servers. The connector source 3110 converts the data format to Avro from Protobuf before it is transmitted to the one or more brokers 3130 (3114). The one or more brokers 3130 transmit the telemetry data to the ML platform 3300. The ML platform 3300 when receiving initial real-time and/or near real-time telemetry data (or historical telemetry data) can analyze the telemetry data to select a ML algorithm model and train the ML algorithm trainer as described further with respect to FIG. 4. The output of the ML algorithm model is then fed back to the one or more brokers 3130, which in turn sends the telemetry data to the one or more connector sinks 3140. The one or more connector sinks 3140 can utilize one or more of the different data analytics software tools to store the received telemetry data. The results can be displayed using the dashboard display device 3200. When new real-time telemetry data is received by the connector source 3110, it is transmitted to the one or more brokers 3130, which in turn sends the data to the ML platform 3300 for analysis based on the selected ML algorithm. The one or more brokers 3130 receive the output from the ML platform 3300, and sends it to one or more connector sinks 3140, which in turn send the telemetry data to data analytics platform 3200 before it is displayed on display device 3400.

Figure 4:
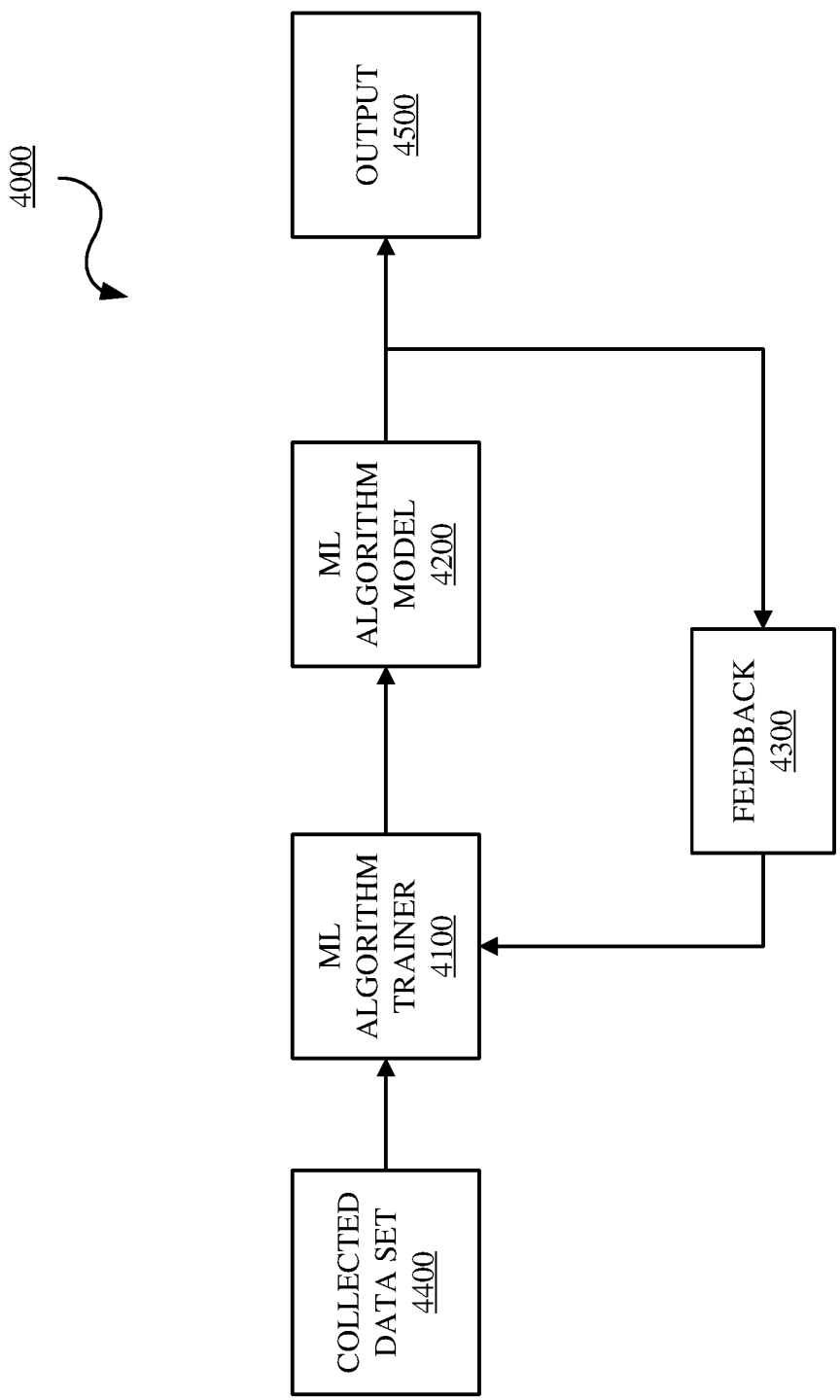
FIG. 4 is a diagram of an example of a machine learning platform in accordance with embodiments of this disclosure.

The machine learning platform 3300 can be used, for example, to analyze the received telemetry data and provide predictive analysis of the remote node device potential failures and how to optimize remote node device performance. FIG. 4 is a diagram of an example of a machine learning platform 4000 in accordance with embodiments of this disclosure. The machine learning platform 4000 includes a machine learning algorithm trainer 4100 connected to a machine learning algorithm model 4200 in a feedback loop 4300. The machine learning algorithm trainer 4100 trains the machine learning model 4200. For example, DataRobot, which is an enterprise AI platform with automated decision intelligence, can be used to select the best training algorithm that matches the collected remote node device telemetry data. The machine learning model 4200 can use, for example, a decision tree algorithm, which consists of series of decisions and actions based on the continuous monitoring of the streamed telemetry data received from the field-deployed remote node device (4400) to produce an output (4500). For example, an initial set of telemetry data can be used for selection of the machine learning model 4200 and training of the machine learning model 4200 by the machine learning algorithm trainer 4100. Subsequent received real-time or near real-time telemetry data can be analyzed using the trained machine learning model 4200, which in turn sends the output to the one or more brokers 3130, for example.

In implementations, the telemetry data, including all the health metrics from all the field-deployed remote node devices can be displayed in a unified hierarchal dashboard for every region of the US or worldwide, as applicable. The machine learning models can be used to analyze the vast amount of telemetry data from the different data analytics database to provide predictive analysis of remote node device field behavior and issues such as potential failures, architectural bottlenecks, etc. Performance comparison of different remote node devices from different service providers or vendors at different geographical areas can be done using, for example, system load, CPU utilization, number of active service flows, throughput of each service flows, etc., to achieve operational optimization.

Figure 5:
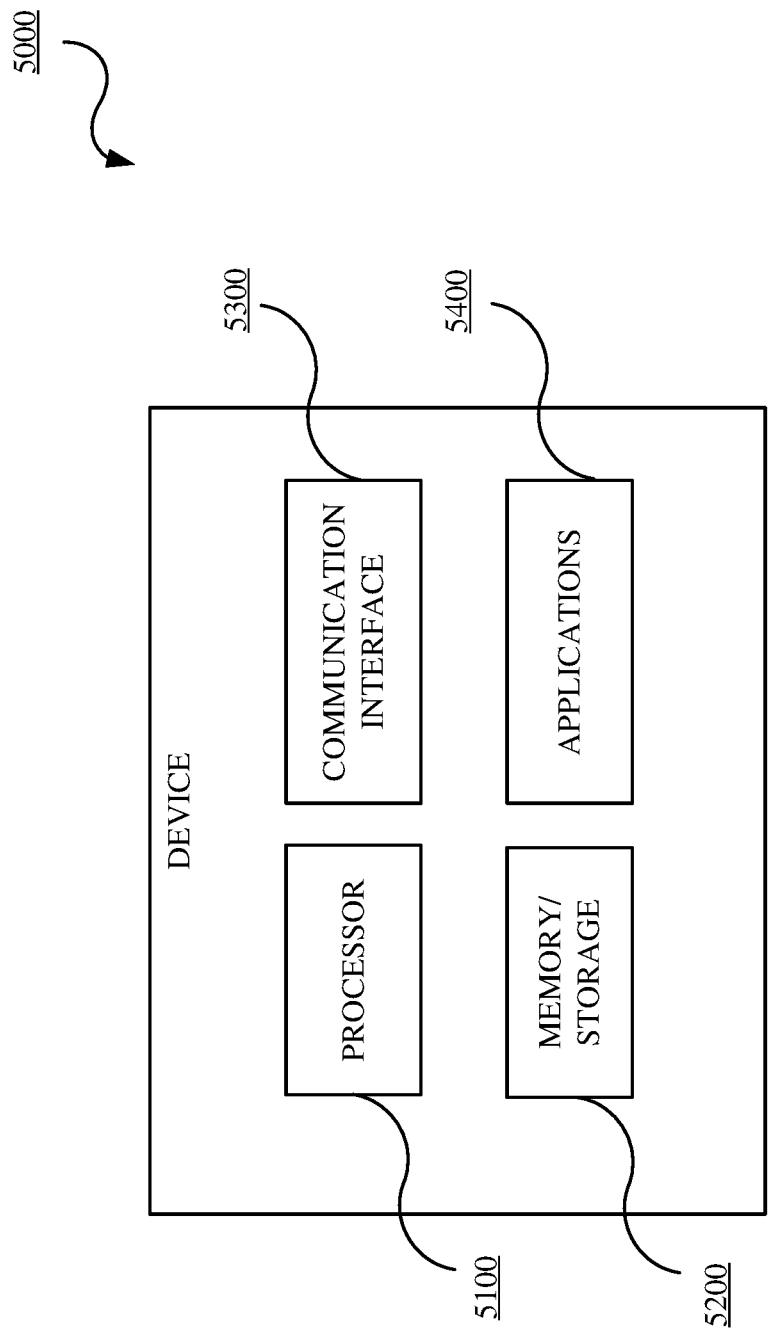
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a multiple-core processor 5100, a memory/storage 5200, a communication interface 5300, and applications 5400. The device 5000 or multiples thereof may include or implement, for example, the CPE $1100_1, 1100_2, \ldots, 1100_N$, the remote node device 1200, the CIN 1250. the headend 1300, the service provider back-office system 1400, the streaming and analytics processing platform 1500, the one or more data analytics platforms 1600, and the dashboard display device 1700, the remote node device 2000, the open-source real-time stream processing platform 3100, the one or more data analytics platforms 3200, the machine learning platform 3300, the dashboard display device 3400, and the machine learning platform 4000, for example. In an implementation, appropriate memory/storage 5200 may store the telemetry data. In an implementation, appropriate memory/storage 5200 is encoded with instructions for remote management and telemetry. The instructions can further include programmed instructions for performing one or more of analysis via convolutional neural networks, deep learning analysis, and/or machine learning. The techniques or methods described herein may be stored in appropriate memory/storage 5200 and executed by the appropriate processor 5100 in cooperation with the memory/storage 5200, the communications interface 5300, and applications 5400, as appropriate. The machine learning platform 4000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 6:
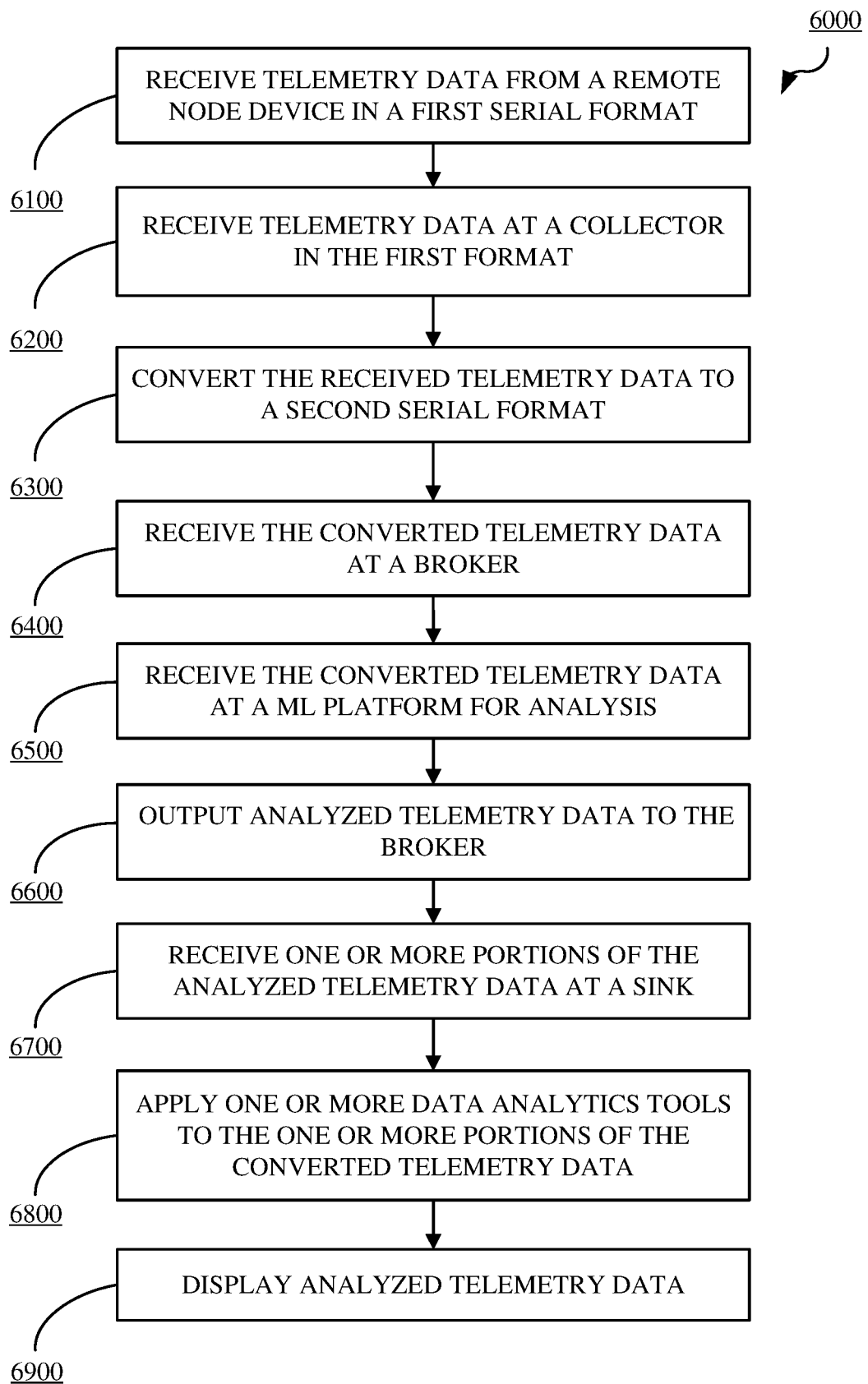
FIG. 6 is a flowchart of an example method for obtaining telemetry data in accordance with embodiments of this disclosure.

FIG. 6 is a flowchart of an example method 6000 for receiving telemetry data in accordance with embodiments of this disclosure. The method 6000 includes: receiving 6100 telemetry data from a remote node device in a first format at one or more collectors at a service provider back-office system; receiving 6200 the telemetry data from the one or more collectors at a connector source at a service provider streaming and analytics processing platform; converting 6300 by the connector source the received telemetry data to a second format; receiving 6400 the converted telemetry data at a broker from the connector source; receiving 6500 converted telemetry data at a ML platform for analysis; sending 6600 analyzed telemetry data to the broker; receiving 6700 one or more portions of the analyzed telemetry data at a connector sink; applying 6800 one or more data analytics tools by the connect sink; and displaying 6900 the analyzed telemetry data. The method 6000 can be implemented, for example, in the CPE $1100_1, 1100_2, \ldots, 1100_N$, the remote node device 1200, the CIN 1250, the headend 1300, the service provider back-office system 1400, the streaming and analytics processing platform 1500, the one or more data analytics platforms 1600, and the dashboard display device 1700, the remote node device 2000, the open-source real-time stream processing platform 3100, the one or more data analytics platforms 3200, the machine learning platform 3300, the dashboard display device 3400, the machine learning platform 4000, the device 5000 the multiple-core processor 5100, the memory/storage 5200, the communication interface 5300, and the applications 5400, as appropriate and applicable.

The method includes receiving 6100 telemetry data from a remote node device in a first format at one or more collectors at a service provider back-office system. The remote node device can receive telemetry data from one or more CPEs. The remote node device can be architected as described and shown in FIG. 2. For example, the remote node device can use an modular and/or open-source carrier-grade agile based software architecture with an integrated operator-defined abstraction layer and VNF software components that implement the vCCAP functionality that enables remote node device command/control, XML-based configuration files with IPDR/SP or XML/JSON-based notifications, and YANG data models using NETCONF and RESTCONF protocols for streaming telemetry data. In implementations, the YANG models are OpenConfig YANG data models, IETF data models, and other described YANG data models. In some implementations, the remote node device can transmit different types of telemetry data including MDT YANG data models and/or IPDR in a first format, where the first format is a serialized data format. An MDT YANG data model can be used to push telemetry data based on an event or on a periodic basis. In implementations, the serialized data format is a Protobuf data format. The service provider back-office system can include one or more telemetry data collectors including YANG data model collectors and IPDR collectors.

The method includes receiving 6200 the telemetry data from the one or more collectors at a connector source at a service provider streaming and analytics processing platform. The service provider streaming and analytics processing platform can be architected as described and shown in FIG. 1 and FIG. 3. The service provider streaming and analytics processing platform can include connector sources which receive the telemetry data from the one or more telemetry data collectors. In implementations, the connector source is a Kafka connector source.

The method includes converting 6300 by the connector source the received telemetry data to a second format and receiving 6400 the converted telemetry data at a broker from the connector source. The connector source converts the telemetry data from first data format to a second data format, where the second data format is a different serialized data format. In implementations, the second serialized data format is an Avro data format. The connector source sends the converted telemetry data to a broker in the service provider streaming and analytics processing platform. In some implementations, the broker is a Kafka broker.

The method includes receiving 6500 converted telemetry data at a ML platform for analysis and sending 6600 analyzed telemetry data to the broker. In some implementations, a machine learning platform can be used on the telemetry data to provide predictive analysis of remote node device potential failures and how to optimize its performance as described with respect to FIG. 3 and FIG. 4.

The method includes receiving 6700 one or more portions of the analyzed telemetry data at a connector sink. The broker transmits one or more portions of the analyzed telemetry data to a connector sink in the service provider streaming and analytics processing platform. In some implementations, the connector sink is a Kafka connector sink. In implementations, the connector sources, broker, and connector sinks are part of a Kafka system which intakes the telemetry data and processes the telemetry data into topics and partitions as understood by one of skill in the art. The one or more portions of the analyzed telemetry data can refer to the topics and partitions which the connect sink can receive or obtain from the broker. The connector sinks are users of the analyzed telemetry data.

The method includes applying 6600 one or more data analytics tools by the connect sink. The connector sinks can have one or more data analytics tools which can be applied to the one or more portions of the analyzed telemetry data and store the data.

The method includes displaying 6700 the analyzed and stored telemetry data. The analyzed and stored telemetry data can be displayed as a dashboard, charts, and other formats.

As described herein, a remote node device includes a hardware layer, a hardware abstraction layer on the hardware layer, and a software stack operating on the hardware abstraction layer. The software stack includes a modular cloud-based operating system integrated with a service provider defined abstraction layer configured to coordinate functionality of the software stack, virtualized software components implemented in a docker container, configured to operate the remote node device with respect to a customer premise equipment, and model-driven telemetry YANG data models configured to stream remote node device and customer premise equipment telemetry data to a service provider back-office system.

The model-drive telemetry YANG data models can include an OpenConfig YANG data model and an Internet Engineering Task Force YANG data model. The OpenConfig YANG data model can be a OpenConfig Dial-Out YANG data model. The OpenConfig Dial-Out YANG data model is configured to stream the customer premise equipment telemetry data via NETCONF and RESTCONF protocols using XML and JSON format schemas.

The virtualized software components further include a virtualized control plane function and a virtualized user plane function, where the virtualized control plane node and the virtualized user plane node enable at least high-speed services to the customer premise equipment.

The software stack can further include an Internet Protocol Detail Record Streaming Protocol (IPDR/SP), IPDR exporter, and a Stream Control Transport protocol (SCTP)/transmission control protocol (TCP), where IPDR/SP and IPDR exporter provide the customer premise equipment telemetry data to the service provider back-office system via the SCTP/TCP module. The software stack can further include a modular virtualized network function (VNF) to provide the physical and media access control layer functionality of the remote node device and implemented in a docker container. The software stack can further include a docker container management module for managing each docker container.

As described herein, a method and/or a non-transitory computer storage medium storing computer-useable instructions that, when used by one or more processors, cause the one or more processors to receive, at one or more collectors at a service provider back-office system from a remote node device, telemetry data in a first data format, receive, at a connector source at a service provider streaming and analytics processing platform from the one or more collectors, the telemetry data in the first data format, convert, by the connector source, the received telemetry data to a second data format, receive, at a broker at the service provider streaming and analytics processing platform from the connector source, the converted telemetry data, receive, at a machine learning platform from the broker, the converted telemetry data for analysis, receive, at the broker from the machine learning platform from the broker, the analyzed telemetry data, receive, at a connector sink at the service provider streaming and analytics processing platform from the broker, one or more portions of the analyzed telemetry data, apply, by the connector sink, one or more data analytics tools to the one or more portions of the analyzed telemetry data, and display, at a display, the analyzed telemetry data.

The one or more collectors are associated with at least model-driven telemetry YANG data models. The at least model-driven telemetry YANG data models are OpenConfig YANG data models. The at least model-driven telemetry YANG data models are OpenConfig Dial-Out YANG data models.

The first data format and the second data format are different serialized data formats. The first data format is Protobuf and the second data format is Avro.

The instructions can further cause the one or more processors to apply, at the machine learning platform, machine learning analysis to the converted the telemetry data to provide predictive analysis of remote node device potential failures and optimize performance.

As described herein, a system for processing telemetry data can include a remote node device in communication with one or more customer premise equipment. The remote node device can include a physical layer, a hardware abstraction layer on the hardware layer, and a software layer operating on the hardware abstraction layer. The software layer can include a modular cloud-based operating system integrated with a service provider defined abstraction layer configured to coordinate functionality of the remote node device, a virtualized software component implemented in a docker container and configured to operate the remote node device with respect to the one or more customer premise equipment, and model-driven telemetry YANG data models configured to stream remote node device and customer premise equipment telemetry data to a service provider system. The service provider system can include one or more collectors configured to receive the telemetry data from the remote node device, a streaming and analytics processing platform configured to receive and process the telemetry data from the one or more collectors, a machine learning platform configured to analyze the telemetry data from the one or more collectors, a data analytics platform configured to store and process the analyzed telemetry data, and a display configured to present visualizations of the analyzed telemetry data.

The model-driven telemetry YANG data models are OpenConfig Dial-Out YANG data model which are configured to stream customer premise equipment telemetry data via NETCONF and RESTCONF protocols via XML and JSON format schemas to a corresponding collector of the one or more collectors.

The virtualized software components can further include a virtualized control plane function and a virtualized user plane function, where the virtualized control plane node and the virtualized user plane node enable at least high-speed services to the one or more customer premise equipment.

The software stack can further include an Internet Protocol Detail Record Streaming Protocol (IPDR/SP), IPDR exporter, a Stream Control Transport protocol (SCTP)/transmission control protocol (TCP), where the IPDR/SP and the IPDR exporter provide the customer premise equipment telemetry data to the service provider back-office system via the SCTP/TCP module, a modular virtualized network function (VNF) to provide the physical layer functionality of the remote node device and implemented in a docker container, and a docker container management module for managing each docker container.

The machine learning platform can be configured to analyze telemetry data to provide predictive analysis of remote node device potential failures and optimize performance.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A remote node device, comprising:
   a hardware layer;
   a hardware abstraction layer on the hardware layer; and
   a software stack operating on the hardware abstraction layer, the software stack comprising:
      a modular network-based operating system integrated with a service provider defined abstraction layer configured to coordinate functionality of the software stack;
      virtualized software components implemented in a docker container, configured to operate the remote node device with respect to a customer premise equipment;
      model-driven telemetry Yet Another Next Generation (YANG) data models configured to stream remote node device and customer premise equipment telemetry data to a service provider back-office system;
      an Internet Protocol Detail Record Streaming Protocol (IPDR/SP);
      IPDR exporter; and
      a Stream Control Transport protocol (SCTP)/transmission control protocol (TCP) module,
      wherein IPDR/SP and IPDR exporter provide the customer premise equipment telemetry data to the service provider back-office system via the SCTP/TCP module.

2. The remote node device of claim 1, wherein the model-drive telemetry YANG data models further comprising:
   an OpenConfig YANG data model; and
   an Internet Engineering Task Force YANG data model.

3. The remote node device of claim 2, wherein the OpenConfig YANG data model is a OpenConfig Dial-Out YANG data model.

4. The remote node device of claim 3, the OpenConfig Dial-Out YANG data model is configured to stream the customer premise equipment telemetry data via NETCONF and RESTCONF protocols using XML and JSON format schemas.

5. The remote node device of claim 4, wherein the virtualized software components further comprising:
   a virtualized control plane node; and
   a virtualized user plane node,
   wherein the virtualized control plane node and the virtualized user plane node enable at least high-speed services to the customer premise equipment.

6. The remote node device of claim 1, the software stack further comprising:
   a modular virtualized network function (VNF) to provide a physical and media access control layer functionality of the remote node device and implemented in the docker container.

7. The remote node device of claim 6, the software stack further comprising:
   a docker container management module for managing each docker container.

8. A system for processing telemetry data, the system comprising:
   a remote node device in communication with one or more customer premise equipment, the remote node device comprising:
      a physical layer; and
      a hardware abstraction layer on the physical layer; and
      a software layer operating on the hardware abstraction layer, the software layer comprising:
         a modular network-based operating system integrated with a service provider defined abstraction layer configured to coordinate functionality of the remote node device;
         a virtualized software component implemented in a docker container and configured to operate the remote node device with respect to the one or more customer premise equipment;
         model-driven telemetry Yet Another Next Generation (YANG) data models configured to stream remote node device and customer premise equipment telemetry data to a service provider system;
         an Internet Protocol Detail Record Streaming Protocol (IPDR/SP);
         IPDR exporter; and
         a Stream Control Transport protocol (SCTP)/transmission control protocol (TCP) module,
         wherein IPDR/SP and IPDR exporter provide the customer premise equipment telemetry data to the service provider back-office system via the SCTP/TCP module; and
   the service provider system comprising:
      one or more collectors configured to receive the telemetry data from the remote node device;
      a streaming and analytics processing platform configured to receive and process the telemetry data from the one or more collectors;
      a machine learning platform configured to analyze the telemetry data from the one or more collectors;
      a data analytics platform configured to store and process the analyzed telemetry data; and
      a display configured to present visualizations of the analyzed telemetry data.

9. The system for processing telemetry data of claim 8, wherein the model-driven telemetry YANG data models are OpenConfig Dial-Out YANG data model which are configured to stream the customer premise equipment telemetry data via NETCONF and RESTCONF protocols using XML and JSON format schemas to a corresponding collector of the one or more collectors.

10. The system for processing telemetry data of claim 9, the virtualized software components further comprising:
    a virtualized control plane function; and
    a virtualized user plane function,
    wherein the virtualized control plane function and the virtualized user plane function enable at least high-speed services to the one or more customer premise equipment.

11. The system for processing telemetry data of claim 10, the software layer further comprising:
    a modular virtualized network function (VNF) to provide a physical layer functionality of the remote node device and implemented in the docker container; and a docker container management module for managing each docker container.

12. The remote node device of claim 10, wherein the machine learning platform is configured to analyze the telemetry data to provide predictive analysis of remote node device potential failures and optimize performance.

13. The system for processing telemetry data of claim 9, the streaming and analytics processing platform further comprising:
- a connector source configured to receive the telemetry data in a first data format and convert the received telemetry data to a second data format;
- a broker configured to receive the converted telemetry data;
- the machine learning platform configured to receive the converted telemetry data from the broker;
- the broker configured to receive analyzed telemetry data from the machine learning platform; and
- a connector sink configured to receive one or more portions of the analyzed telemetry data from the broker and apply one or more data analytics tools to the one or more portions of the analyzed telemetry data.

14. The system for processing telemetry data of claim 13, wherein the first data format and the second data format are different serialized data formats.

15. The system for processing telemetry data of claim 13, wherein the first data format is Protobuf and the second data format is Avro.

16. The system for processing telemetry data of claim 9, wherein the one or more collectors are associated with at least the model-driven telemetry YANG data models.

17. The system for processing telemetry data of claim 16, wherein the at least model-driven telemetry YANG data models are OpenConfig YANG data models.

18. The system for processing telemetry data of claim 16, wherein the at least model-driven telemetry YANG data models are OpenConfig Dial-Out YANG data models.

* * * * *